Figure 1:
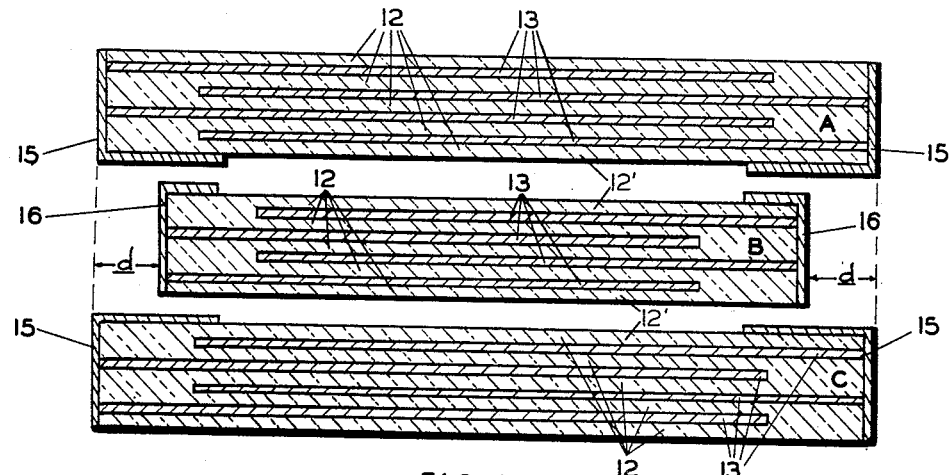

Nov. 13, 1945.  K. H. BALLARD  2,389,018

TERMINAL FASTENING FOR ELECTRICAL CAPACITORS

Filed Oct. 4, 1943

INVENTOR.
KERMIT H. BALLARD
BY
E. H. O'Brien
ATTORNEY

Patented Nov. 13, 1945

2,389,018

UNITED STATES PATENT OFFICE 2,389,018

TERMINAL FASTENING FOR ELECTRICAL CAPACITORS

Kermit H. Ballard, Perth Amboy, N. J., assignor to E. I. du Pont de Nemours & Company, Wilmington, Del., a corporation of Delaware Application October 4, 1943, Serial No. 504,887

2 Claims. (Cl. 29—25.42)

This invention relates to a new and improved arrangement for fastening terminals or lead wires to ceramic capacitors of the type wherein the electrode plates are formed of fired metallic silver and the dielectric layers are formed of a vitreous enamel possessing dielectric properties. Such capacitors are useful as elements in electrical, radio, and radar circuits. Ceramic capacitors of the type with which this invention is concerned are disclosed, for example, in the copending applications Deyrup and Ballard, Serial No. 504,882, filed October 4, 1943; Serial No. 504,883, filed October 4, 1943; and of Deyrup, Serial No. 504,885, filed October 4, 1943; in the copending application of Deyrup, Ballard, and Strickarz, Serial No. 504,884, filed October 4, 1943; and in my copending application Serial No. 504,886, filed October 4, 1943.

Electrical capacitors formed of ceramic materials comprise, as the essential unit, two or more electrically conductive layers separated by one or more layers of insulating dielectric material. In addition to this essential unit, electrical capacitors as commercially manufactured and sold are ordinarily provided with protective insulating cases or coatings, and with two or more terminals for providing electrical connection between the electrically conductive layers and the other elements comprising the electrical circuit of which the capacitor is made a part.

In preparing the usual fixed, mica dielectric, capacitors standards have been set up which require that the tensile strength of the joint between the terminal or lead wire and the capacitor body proper be equal to or greater than the tensile strength of the wire itself. For the usual Number 18 gauge copper wire used in providing the terminal or lead wires for electrical capacitors, this tensile strength is approximately 50 lbs. Furthermore, American Standards Association specifications require that the faces of the electrical capacitors should be flat, the end edges straight, and the terminal or point of attachment of the electrical lead wire located on the center line of the capacitor within plus or minus one thirty-second of an inch.

I have now devised a novel and effective means of attaching terminal wires or lead wires to ceramic capacitors of the type described, more particularly of the type disclosed in the above-identified copending patent applications, which attachment method permits meeting the specifications as to tensile strength and shape which have been set up for fixed electrical capacitors. This improved terminal attachment means may be readily utilized in the commercial manufacture of preferred types of vitreous or ceramic capacitors as disclosed in these copending applications. My improved connection is characterized by surprisingly high tensile strength, this high tensile strength resulting from the mode of attachment utilized whereby the soldered connection of the terminal or lead wire to the capacitor is secured to a silver layer fired on the face or surfaces of the capacitor. By providing this type of connection a tension or pull on the lead wire produces a shearing stress instead of perpendicular pull on the fired silver soldering electrodes of the capacitor.

It is, accordingly an object of this invention to provide an improved construction whereby an electrical lead wire or terminal may be attached to a ceramic capacitor, more particularly to one of the type disclosed in the above-identified copending applications. Another object of this invention is to provide a terminal connection of strength and rigidity sufficient to meet American Standards Association specifications, whereby the stresses tending to separate the terminal wire from the capacitor are shearing stresses instead of the usual perpendicular pull on the fired silver layers. Still another object of this invention is to provide means of attaching terminals or lead wires to electrical capacitors of the type described wherein the shape of the finished capacitor and the point of attachment of the terminals may be so arranged as to comply with the aforesaid specifications. These and still further objects of this invention will be apparent from the ensuing disclosure of certain preferred embodiments thereof.

Figure 2:
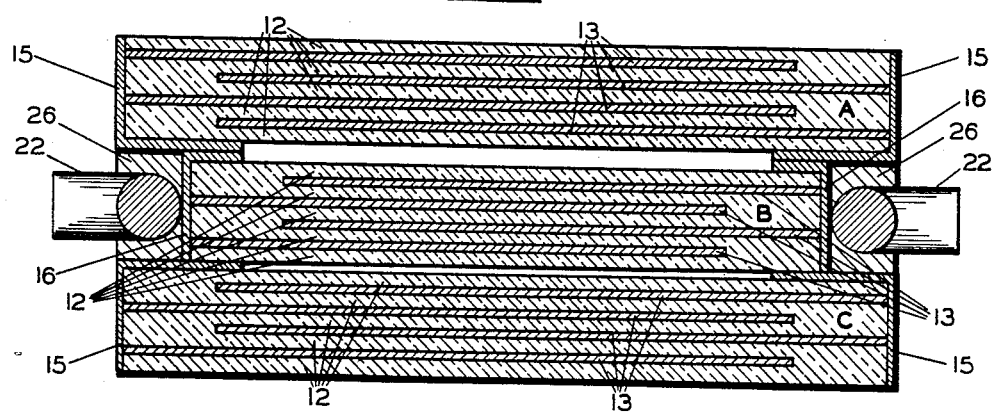
Figure 3:
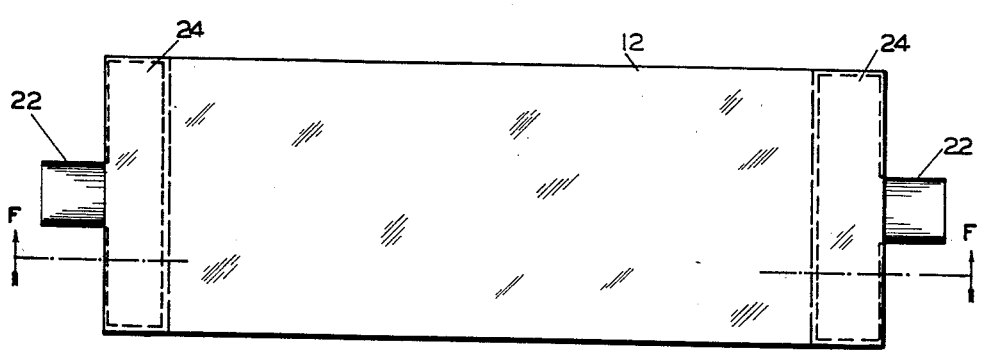

My invention is best illustrated with reference to the annexed drawing, which is to be regarded as illustrative thereof, but not necessarily restrictive of the procedure I employ in forming my improved terminal connection. In that drawing Figure 1 is a diagrammatic view, some parts being shown in section, which view illustrates the three sections into which an electrical capacitor of the type described may be sub-divided in order to permit ready attachment of terminal connections thereto by means of my improved procedure. Figure 2 is a diagrammatic cross-sectional view taken on the line F—F of Fig. 3 showing the terminals in place on the ceramic capacitor. Figure 3 is a plan view, some parts being omitted for purposes of clarity, showing the T-shaped heads on the terminal wires, so arranged as to permit their ready attachment to the electrical capacitor.

As will be apparent from Figure 1 of the drawing, I first build up a ceramic capacitor in the usual way by providing alternate layers of vitreous enamel dielectric and layers of metallic silver suspended in a suitable vehicle. Upon firing, there results the desired unitary monolithic structure. This procedure is in accordance with the disclosures in the above-identified patent applications, for details of which said cases should be consulted.

As will be noted, however, instead of building up a single ceramic capacitor having the required number of metallic electrodes or plates the capacitor is built up in the three separate sections or units A, B, and C. One of these units, B, has a thickness, i. e. that of the vitreous enamel layers and metallic plates or electrodes built up, equivalent approximately to ⅓ of the desired thickness of the finished capacitor, but it is shorter in one dimension, the length, than units A and C. Thus, section B may be approximately ⅛" shorter than sections A and C, thus providing an indentation of one-half this amount at each end of the capacitor in which the lead wires or terminals may be positioned. This indentation is represented by the letters d in Fig. 1. In this figure the layers of vitreous enamel possessing dielectric properties are represented by the numerals 12, while the alternately applied layers of metallic silver, forming the plates of the capacitor, are indicated by the numeral 13.

The other two units comprising the capacitor, units A and C shown more particularly in Figure 1, are both equal in width and length, each forming, in depth, approximately one-third the thickness of the finished electrical capacitor. As is apparent from Figures 1 and 2, these three sections, A, B, and C, are put together to form the finished electrical capacitor, section B, because of its shorter length, being inset a distance d at each end, in which indentations or slots the terminals or lead wires are adapted to be attached.

As shown more especially in Figure 1, in addition to the usual alternate layers of metallic silver forming the plates of the capacitor and layers of vitreous enamel dielectric forming the dielectric layers, I provide cover vitreous enamel dielectric layers 12' to which dielectric layers soldering electrodes 15 are applied. As shown, these soldering electrodes are positioned over the cover vitreous enamel layers 12' and extend around the corner section on the end surfaces of the capacitor so as to provide electrical communication between alternately positioned layers of metallic silver 13 forming the plates of the capacitor.

Section B is also provided with cover dielectric layer 12', to which are attached the soldering electrodes 16, these soldering electrodes, as soldering electrodes 15, being positioned over one cover dielectric layer 12' and extending around the corner on the end surface of the section to provide electrical communication between alternately positioned electrode layers or metallic silver plates 13 of section B of the electrical capacitor.

The three sections or units, A, B, and C, form the finished capacitor when assembled as shown in Figure 2, section B being positioned in a short distance d at each end from the end surfaces of sections A and C. This provides a slot or indentation in each end of the finished capacitor. The sections may be joined together by soldering, although this is ordinarily not necessary at this stage as the sections will be held together in position by the solder subsequently applied in the indented or slot portions for the purpose of holding the terminals or lead wires in place.

I prefer to utilize as the terminals or lead wires 22 members which are provided with the T-shaped heads 24, as shown more especially in Figure 3. However, equally strong fastenings have been produced utilizing terminal wires or lead wires formed with L-shaped heads, although, lead wires with T-shaped heads will generally result in a finished capacitor of better appearance.

As illustrated in the drawing, the terminal wires 22 with T-shaped heads 24 are positioned in the indentations d resulting from the shorter length of the intermediate section B of the ceramic capacitor. After these lead wires are positioned in the indentations a mass of solder is positioned in each, these masses of solder being indicated in the drawing at 26. This solder serves to hold the T-shaped head of the terminal wire in contact with the soldering electrodes 15 and 16, which soldering electrodes are, in turn, in electrical communication with alternate electrode layers or plates of the ceramic capacitor. In this way terminals or lead wires are provided connecting alternate layers or plates of the ceramic capacitor, in accordance with the usual practice in the manufacture of electrical capacitors wherein alternate plates are joined to provide the two electrodes of the capacitor.

It will be apparent that various modifications may be made in my procedure as described without departing from the scope of my invention. Thus, while I have indicated the use of three separate sections or units, A, B, and C, comprising the finished capacitor, satisfactory terminal connections might be produced with suitable design employing two such sections, or even in some circumstances a single monolithic capacitor body section. Ordinarily, however, I prefer to use three sections A, B, and C, as illustrated in the drawing, as this procedure provides easy access to the silver layers forming soldering electrodes 15 and 16, which usually must be burnished before soldering in order that the solder may stick to the silver surfaces.

These and various other modifications of my invention may be employed, it being intended that they shall be considered part of my invention to the extent that they are comprehended within the scope of the appended claims.

I claim:

1. The method of providing terminal connections or lead wires in electrical communication with ceramic capacitors of the type which comprises alternate layers of vitreous enamel dielectric, and alternate layers of fired metallic silver electrode plates which comprises: building up said ceramic capacitor in three separate sections, the innermost section being shorter than the two outermost sections so as to provide, when said three sections are assembled, indentations in which said lead wires may be positioned; positioning soldering electrodes in electrical communication with alternate layers of metallic silver forming the electrodes of said ceramic capacitor, said soldering electrodes being so arranged as to coat interior surfaces of said indentations; and soldering the electrical lead wires to said soldering electrodes while said lead wires are positioned in said indentations.

2. The process defined in claim 1 wherein the lead wires are provided with T-shaped head portions adapted to fit in said indentations.

KERMIT H. BALLARD.